United States Patent [19]

Wallick et al.

[11] Patent Number: 4,640,187
[45] Date of Patent: Feb. 3, 1987

[54] FOOD CORING DEVICE

[75] Inventors: William P. Wallick, 7478 W. 10th Ave., Lakewood, Colo. 80215; Gary J. Hoffman, Arvada, Colo.

[73] Assignee: William P. Wallick, Lakewood, Colo.

[21] Appl. No.: 697,214

[22] Filed: Jan. 31, 1985

Related U.S. Application Data

[63] Continuation-in-part of Ser. No. 553,580, Nov. 21, 1983, abandoned.

[51] Int. Cl.[4] .......................... A23P 1/00; A47J 25/00
[52] U.S. Cl. ....................................... 99/538; 99/485; 99/494; 408/68
[58] Field of Search ................ 99/352, 353, 419, 547, 99/426, 428, 440, 441, 450.1, 450.6, 450.7, 450.8, 494, 485, 537, 538, 567, 551, 646 R, 558; 17/39, 35, 41; 425/133.1, 404, 114; 426/92, 94, 143, 138, 134, 283, 391, 512, 514; 408/67, 68, 207, 203.5

[56] References Cited

U.S. PATENT DOCUMENTS

| | | | |
|---|---|---|---|
| 1,879,146 | 9/1932 | Estrin | 99/441 |
| 2,568,491 | 9/1951 | Edwards | 99/494 |
| 2,822,571 | 2/1958 | Johnson | 425/404 |
| 3,978,733 | 9/1976 | Avot | 99/547 X |
| 4,085,545 | 4/1978 | DaSilva | 99/514 |
| 4,119,020 | 10/1978 | Sharp et al. | 99/441 X |
| 4,162,333 | 7/1979 | Nelson et al. | 99/450.7 |
| 4,252,056 | 2/1981 | Altman | 99/564 |
| 4,343,603 | 8/1982 | Pavlow et al. | 425/463 X |
| 4,469,475 | 9/1984 | Krysiak | 425/133.1 |

Primary Examiner—Timothy F. Simone
Attorney, Agent, or Firm—Gregg I. Anderson

[57] ABSTRACT

An apparatus for forming longitudinally extending bores in food products includes a hollow circular coring knife having a cutting edge formed at a terminal end thereof. Another end of the knife is connected to a connection member rotatively carried by a bearing and which has a passageway formed along the length thereof in communication with the hollow portion of the circular knife. The connection member is rotatively driven by drive means and sealingly connected, at the passageway, to a vacuum source. A retainer structure carries two types of food products, one a relatively larger product in which a larger bore is formed by a knife. The retainer structure is slidable with respect to the knife so that the knife is inserted a predetermined extent of the length of the food product, normally a bun. A second food product, normally a wiener, is also placeable within the retainer structure and bored but at a smaller diameter. The bun bore receives the wiener therealong and the wiener bore or the bun bore receives condiments or other filling to make a final food product.

19 Claims, 11 Drawing Figures

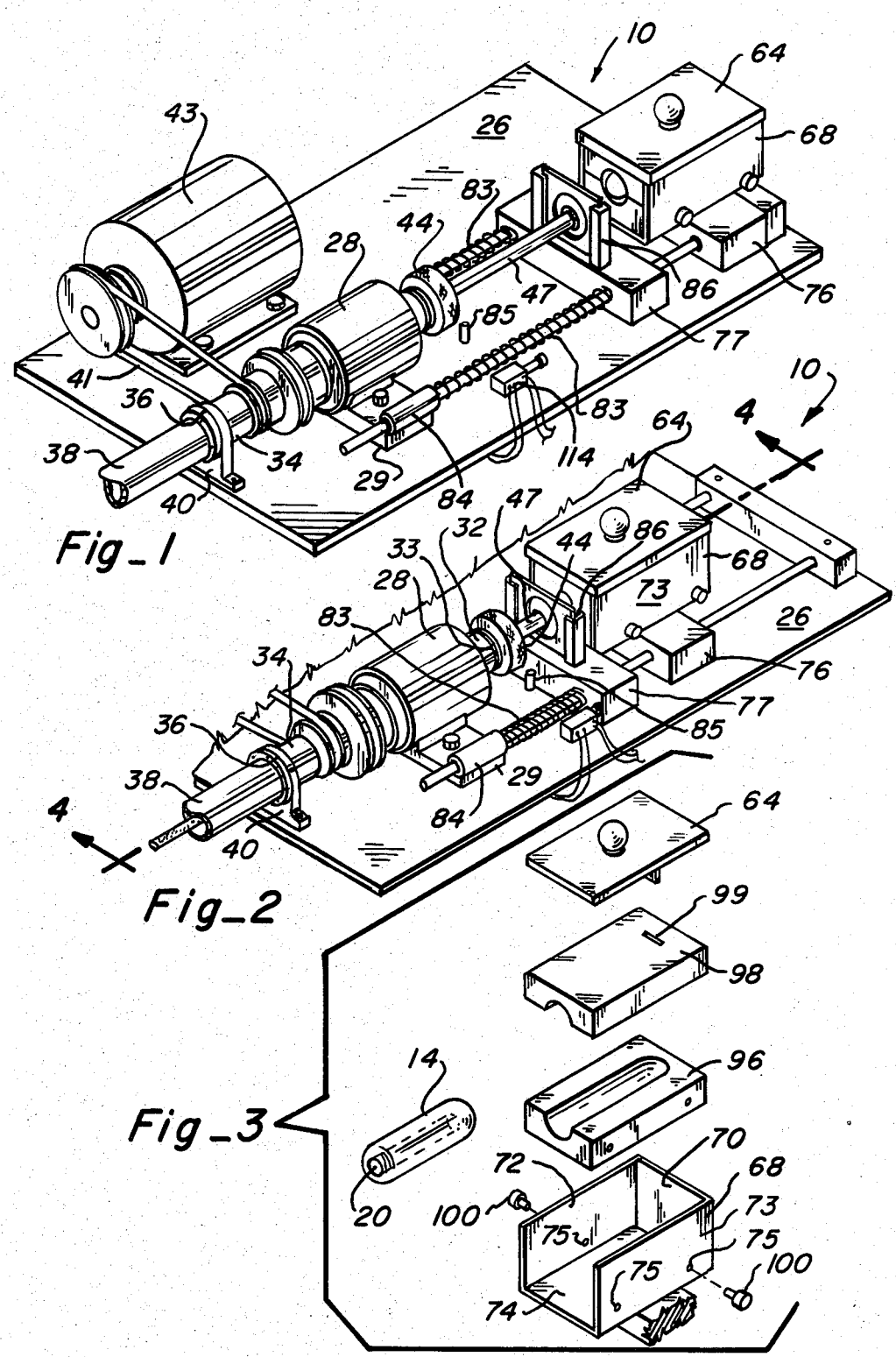
Fig_1
Fig_2
Fig_3

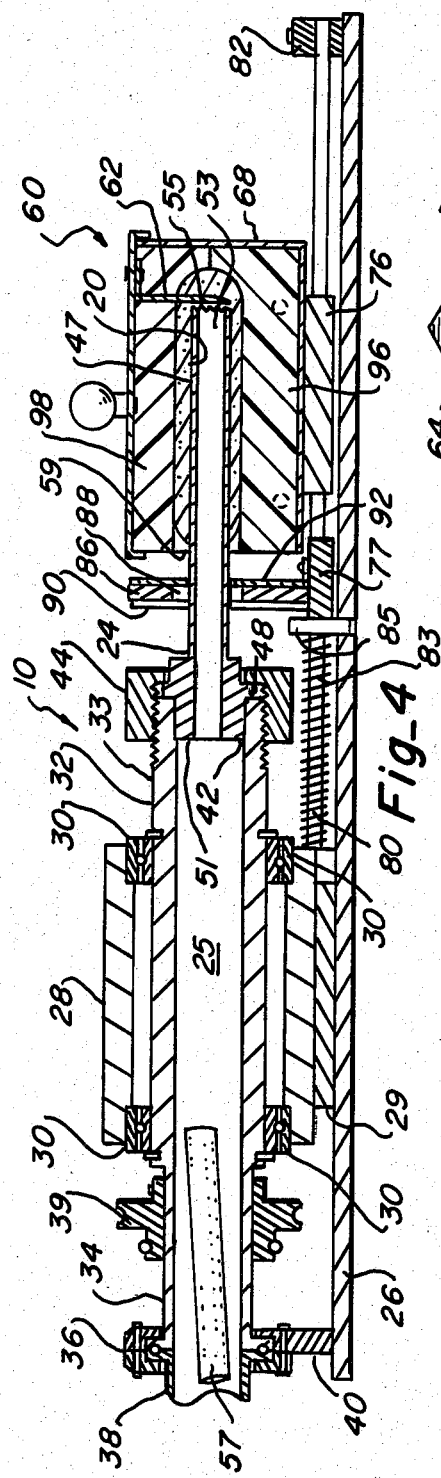
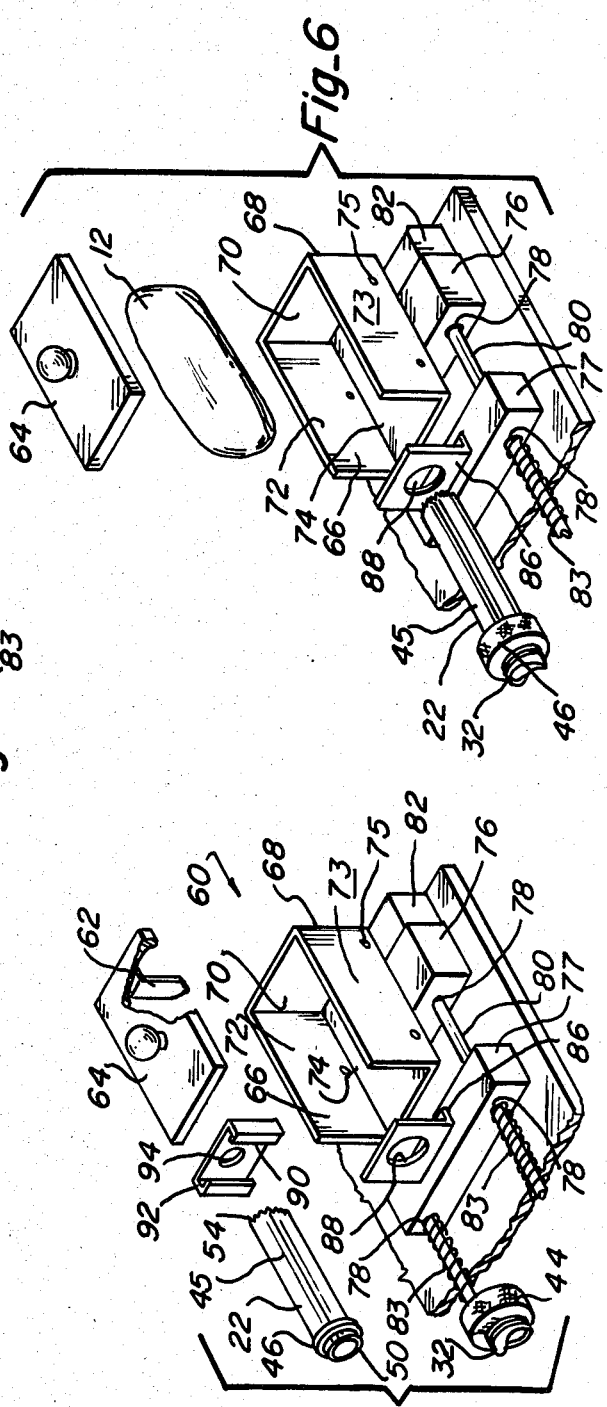

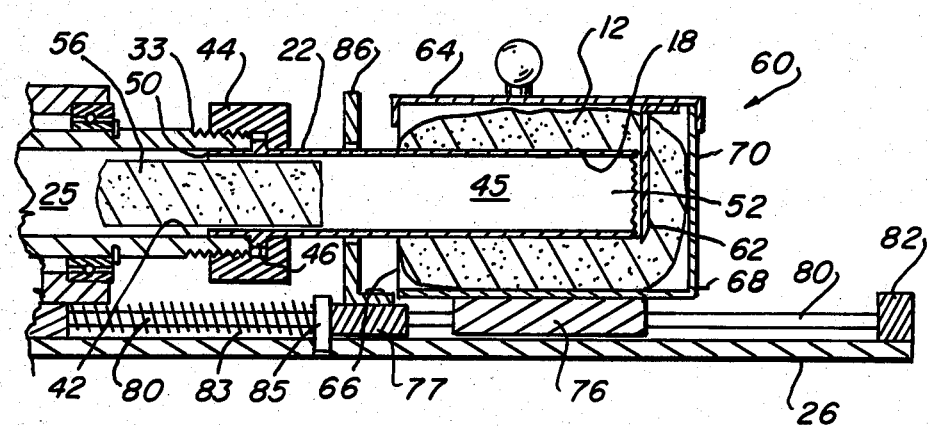
Fig_7
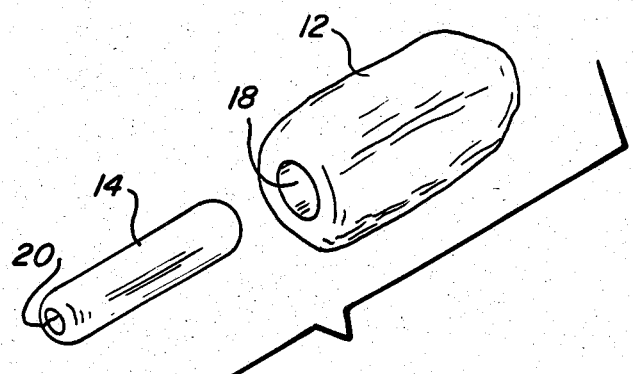
Fig_8
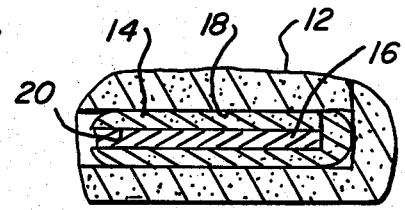
Fig_11
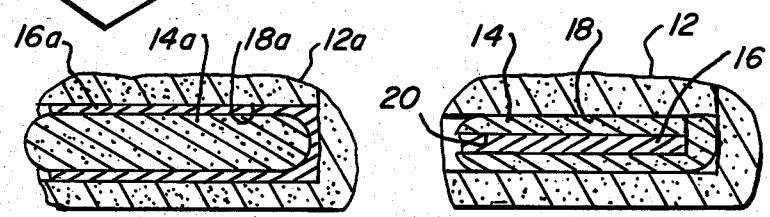
Fig_9

FOOD CORING DEVICE

CROSS-REFERENCE TO RELATED APPLICATION

The present application is a continuation-in-part of copending U.S. patent application Ser. No. 553,580 filed Nov. 21, 1983, ABND. for Wiener Food Product Enclosed in a Bun and Having Provision for Carrying Condiments.

BACKGROUND OF THE INVENTION

1. Field of the Invention

The present invention relates generally to apparatus for manufacturing and producing food products. Such food products include stuffed wieners and wieners completely or partially encapsulated within bread or bun outer coverings. More particularly, the present invention relates to apparatus for forming bores or recesses within food products. A bore or recess is formed in one food product for receipt of another food product within the recess or bore.

2. Brief Description of the Prior Art

Various machines for hollowing or coring frankfurters, weiners or buns for the receipt of another food product are known. Hollow frankfurters are formed by a machine seen in U.S. Pat. No. 2,822,571 to R. M. Johnson. It is suggested in Johnson that the opening formed by the machinery is for the insertion of condiments into the interior of the frankfurter. Another machine for making a bore along the length of frankfurters is seen in U.S. Pat. No. 2,568,491 to L. G. Edwards. Bun forming machinery for making elongated buns with deep recesses along the length thereof, and having closed ends, for receiving frankfurters, relish and other food, is seen in U.S. Pat. No. 2,580,726 to C. W. Brewer. Brewer is similar to conventional buns, eliminating the hinge.

L. Schott, U.S. Pat. No. 3,161,154, discloses a means and method for inserting a filling of cheese along the length of a frankfurter. A tool first cuts a strip of cheese and the tool is inserted into one end of the frankfurter, depositing the cheese in the opening previously made by the tool.

An edible food product envelope formed by the insertion of a pair of inclined surfaces into a bun is shown in K. Bemis, U.S. Pat. No. 1,842,576. K. Bemis in U.S. Pat. No. 1,807,189 shows a second utensil for making a slit in a bun to carry food products. Finally, K. Bemis in U.S. Pat. No. 1,873,920 discloses a device to fill the pocket of a bun, made through use of one of the other Bemis utensils, with another food product.

An iron, including a cavity or a recess, defining a mold for a food product to be formed about a previously cooked sausage or frankfurter is seen in F. Matson, U.S. Pat. No. 1,492,603. A core device about which dough is baked, forming a recess for stuffing and the like, is seen in C. Wilkes, et al., U.S. Pat. No. 1,957,031.

A plunger device for filling sandwich buns having interior openings therein is discussed in H. Clevenger, U.S. Pat. No. 2,784,682. A coring device for rolls is also seen in C. Haskel, U.S. Pat. No. 1,679,660. An implement for piercing an end of a baked product, along a longitudinal axis to within a short distance of the opposite end of the product is described in U.S. Pat. No. 1,802,532 to B. Pulver. The recess formed in Pulver is used to receive food filling.

A structure for making filled food products is shown in Nelson, et al., U.S. Pat. No. 4,241,649. Nelson extrudes dough pieces onto a coring device. The dough pieces are cooked, leaving a core within the dough for receipt of filler or stuffing at a later time.

Augering out the interior of a bun with an auger device for later extrusion of a filling into the bun is known in the prior, non patented, art. A weiner totally encapsulated in dough is seen in U.S. Pat. No. 3,656,968 to D. F. Allen. R. Laugherty, U.S. Pat. No. 3,959,503 discloses a food product including an elongated tubular wiener partially encapsulated by a bun completely around the circumference and along at least one-half the length of said wiener. The wiener has a bore extending substantially the entire length of the wiener, which bore receives condiments.

A food product insertable within a food recess of another edible food product is shown in C. Baisden, U.S. Pat. No. 4,251,554. Baisden also describes a mold for making the edible food product used to receive the second food product.

Various other stuffed wieners and bores in buns are seen in W. Serr, U.S. Pat. No. 2,240,522; W. Serr, U.S. Pat. No. 2,186,435; N. Hall, U.S. Pat. No. 1,569,121; J. Lynn, U.S. Pat. No. 2,892,719; D. Holibaugh, U.S. Pat. No. 1,816,283; M. Brin, U.S. Pat. No. Des. 118,614; and E. Mandelbaum, U.S. Pat. No. 1,600,191.

OBJECTS AND SUMMARY OF THE INVENTION

It is the principal object of the present invention to provide an apparatus for forming bores within food products.

It is a related object to the present invention to provide an apparatus for forming longitudinal bores within two food products, a first food product in the nature of an elongated generally cylindrical bun and the second in the nature of a wiener. The first bore is formed in the bun so as to matingly receive the wiener, and the second bore being formed in the wiener for receipt of filling. condiments and the like.

It is another object of the present invention to provide an apparatus for forming bars within food products wherein core material removed from the food product is withdrawn to a remote area for disposal.

It is a further related object of the present invention to provide an apparatus for forming bores in food products wherein a vacuum is applied along a passageway through the apparatus for removing core material from the food products.

It is a still further object of the present invention to provide an apparatus for forming bores within food products which apparatus has a food retainer structure slideably mounted with respect to a circular cutting or coring means for forming said bore.

It is a still further object of the present invention to provide an apparatus for forming bores within food products which includes a cutting edge associated with the retainer structure for cutting through said food products at the termination of a circular hole formed by the circular cutting means to thereby separate the core material from the food product.

In accordance with the objects of the present invention, a mounting base is rigidly connected to a relatively large, elongated ring bearing. A hollow connection or collar assembly is rotatably mounted within the ring bearing and projects at either end away from the bearing. At a first end, the collar is rotatably driven by a motor. The collar is hollow along its entire length, defining a passageway, and sealingly connects at the one end to a vacuum source. The passageway through the collar is in air communication with an elongated hollow tubular circular coring knife or cutting means, selectively connected to a second end to the collar. The circular knife has a tubular body which extends away from the collar a prestablished distance terminating in a circular cutting edge having serrated teeth.

A retainer structure holds a food product which can be either a first food product, a bun, or a second food product, a wiener or sausage. With respect to the first food product, the retainer structure is generally conformable thereto and includes an opening at an end nearest the circular knife, which opening receives the circular cutting edge of the circular knife. The retainer structure is slidable with respect to the circular knife, allowing the cutting edge to penetrate the retainer structure and enclosed food product a pre-determined extent corresponding to the length of bore required.

A second cutting edge is provided in association with the retainer structure for slitting the food product transversely to the circular cut made by the circular knife, allowing removal of core material of the food product through the circular knife, along the passageway, to the vacuum source. The cutting edge is connected to a lid on the retainer structure and transversely passed through the first or second food product providing a slit therethrough which registers with the deepest penetration of the cutting edge of the circular knife into the food product. Core material is withdrawn through the hollow drill bit, the collar assembly and to a disposal location by negative pressure from the vacuum source.

The vacuum source is in communication with the passageway through a hose. A gate valve is actuated by movement of the retainer structure, at the deepest of the cutting edge into the food product. Opening the gate valve allows a vacuum chamber to draw a vacuum of up to 30 in. Hg on the core material of the food product. The vacuum chamber is charged by a vacuum pump. The chamber receives the core material for ease of disposal. A screen is provided to protect the vacuum pump from ingesting the core material.

DESCRIPTION OF THE DRAWINGS

FIG. 1 is a perspective view of a food coring device of the invention, a retainer structure for a food product positioned prior to a cutting process for forming a bore in the food product.

FIG. 2 is a fragmentary perspective view similar to FIG. 1, with the retainer structure advanced to show an elongated tubular circular knife penetrating the retainer structure to form the bore in the food product.

FIG. 3 is an exploded perspective view of the retainer structure shown in FIGS. 1 and 2, a wiener food product also being shown.

FIG. 4 is a sectional view taken in the plane of line 4—4 of FIG. 2.

FIG. 5 is a partially exploded perspective view of the retainer structure for use with a bun food product, the circular knife also being shown.

FIG. 6 is perspective view similar to FIG. 5, a bun food product also being shown.

FIG. 7 is a fragmentary sectional view of the food coring device forming a bore in a bun food product.

FIG. 8 is an exploded perspective view of a food product formed from the bun and wiener food products using the coring device of the invention.

FIG. 9 is a sectional view of a food product formed using the coring device of the invention.

FIG. 11 is an alternative embodiment of a food product formed using the coring device of the present invention.

DESCRIPTION OF THE PREFERRED EMBODIMENTS

Figure 10:
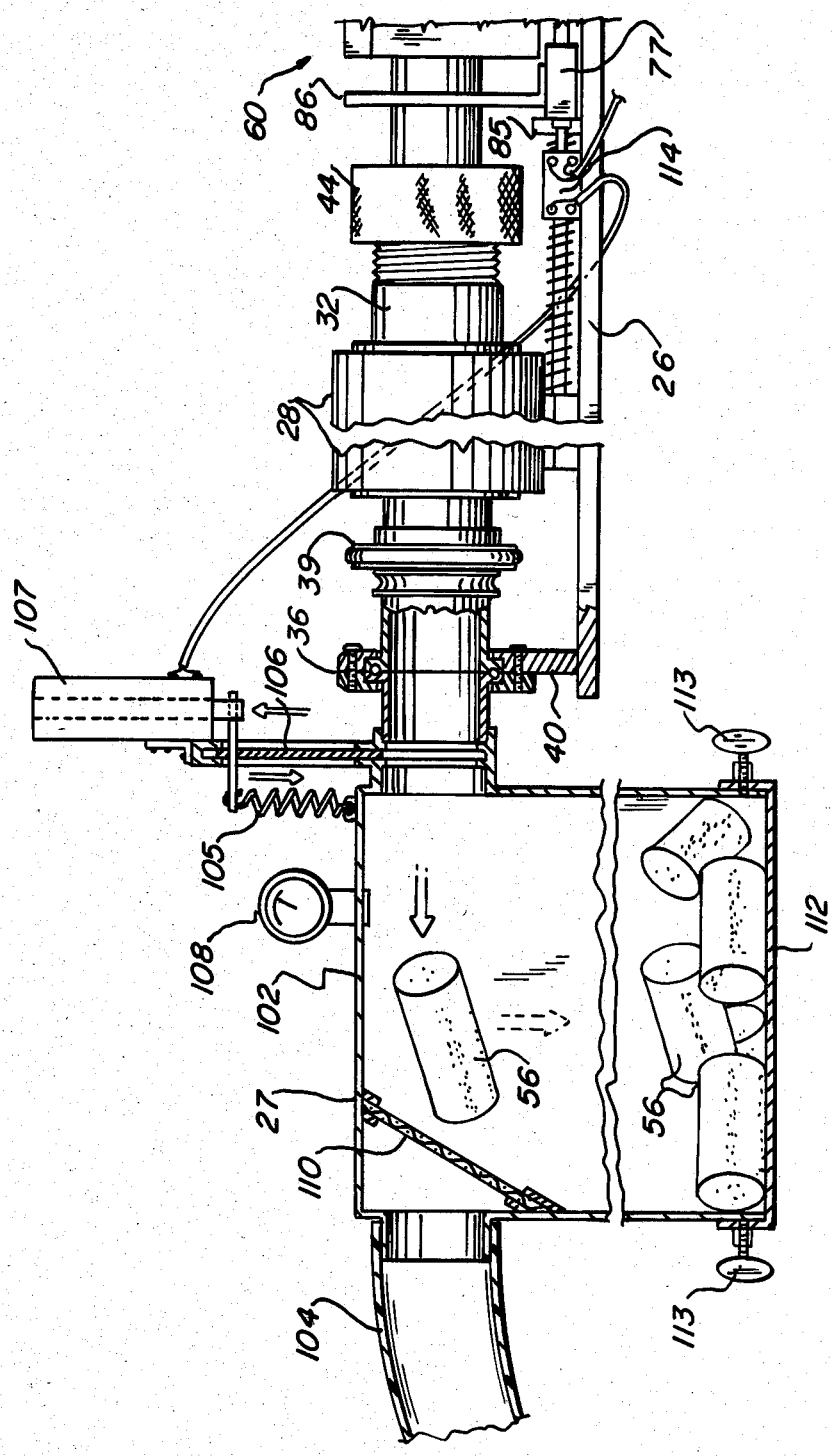
FIG. 10 is a fragmentary sectional view of a connection between the boring device of the invention and a vacuum source intermitingly actuated to withdraw core material from the food product as the bore in the food product is completed.

A food coring device 10 is seen in FIGS. 1, 2 and 4, which coring device 10 is particularly well suited for preparing a first food product or bun 12 for receipt of a second food product or wiener 14, and for preparing the wiener for receipt of condiments, stuffing, or filling 16 by forming bores 18 and 20 respectively therein (FIGS. 8 and 9). The resulting bun 12 partially incapsulates a wiener 14 mated into the bore 20 and is readily edible and easily handled by the consumer.

The hollow elongated bore 20 of the wiener 14 extends substantially the length of the wiener for carrying the condiments 16 and other stuffing suited to the use of the consumer. The bore 18 of the bun 12 extends substantially the length of the bun 12 and is adapted to receive, in a generally mated relationship, one end of the wiener 14. Accordingly, the bun 12 provides handle means for the food product and the wiener carries the relish, mustard, ketchup, cheese or other condiment 16 of choice.

The wiener 14 is of generally conventional configuration being of elongated tubular construction. A second top end of a the wiener 14 is cut in a plane perpendicular to a longitudinal axis thereof, defining a plane or face. The bottom end of the wiener 14 is of hemispherical shape.

The bore 20 of the wiener is formed substantially along the entire length of the wiener 14 from the top end to a point near the hemispherical end. The bore 20 receives the condiments 16 of the consumers choosing. The wiener is of a large size, weighing two ounces and being five inches in length and one inch in diameter. The bore 20 would measure approximately three eighths of an inch in diameter and four and one half inches in length. This configuration allows the meat content to remain about the same as a smaller wiener. The bore 14 is easily filled with the condiments 16 because the diameter is relatively large.

The bun 12 is formed so that bore 18 fits around an exterior surface of the wiener 14 and extends along a portion of the length of the wiener 14. The bun is therefore of generally cylindrical configuration having a generally planar face and an enlarged rounded end. The bore 18 is formed in the second planar face for a substantial length of the bun terminating near the enlarged rounded end. The bore 18 has a diameter equal to the outside diameter of the wiener 14 providing a mating recess for the wiener upon insertion of the wiener into the bore 18. The bun extends at least half way along the length of the wiener, providing easily used handle means for the food product.

In an alternative embodiment of the food product formed by the coring device 10 seen in FIG. 11, a wiener 14a is not cored. Condiments are placed in bore 18a of a bun 12a.

The bores 18, 18a and 20 are formed in part by a first elongated hollow circular knife 22 for bores 18 and 18a and a second hollow elongated circular knife 24 for bore 20. The first circular knife 22 has a diameter substantially the same as the diameter of the weiner 14 so that the bore 18 formed in the bun 12 mates with the wiener 14. The hollow circular knives 22 and 24 are in air communication with a vacuum chamber 27 connected to a vacuum pump source (not shown) by an elongated passageway 25 through the food boring device 10 and the hollow portions of the circular knives 22 and 24. (FIGS. 4 and 7). The hollow circular knives 22 and 24, in conjuction with the passageway 25 and a vacuum pump hose 38 connecting the food boring device 10 to the vacuum chamber 27, removed bun core portions 56 of material and wiener core portions 57 of material from the bores 18, 18a and 20 for disposal.

A support plate 29 of the food coring device 10 is securely mounted to a base 26. The support plate 29 has mounted thereon a hollow cylindrical sleeve or ring 28 having four bearings 30 mounted at equal arcuate increments about the circumference of the sleeve 28 at either end thereof for rotatably mounting within the sleeve 28 a connection or collar assembly 32 of elonged hollow cylindrical configuration.

One end 33 of the collar assembly 32 mounts therein the hollow circular knives 22 and 24, while the second end 34 of the collar assembly 32 connects through a rotary seal 36 to a vacuum hose 38 and then to the vacuum chamber 27. A drive pulley 39 is mounted to an exterior surface of the collar 32 at the second end 34. The drive pulley receives a drive belt 41 (FIG. 1) which drive belt is operatively connected to a drive motor 43 to turn the collar 32 and one of the attached circular knives 22 or 24.

A hose support 40 is connected to the base 26 and fixedly connects to an end of the hose 38 adjacent to the rotary seal 36. The hose support 40 thereby positions the end of the hose 38 to establish sealing contact with the end 34 of the connecting collar 32 through the rotary seal 36.

One of the circular knives 22 or 24 is connected to the first end 33 of the collar 32 by inserting a mating projection 50 for knife 22, and 51 for knife 24, into a connection mouth 42 of the collar 32. The projections 50 and 51 are short cylindrical projections which mate with an interior surface of the mouth 42 and mark the termination of the hollow portion of the circular knives 22 and 24, at which termination the passageway 25 of the food coring device 10 continues through the collar 32 to carry bun core portions 56 and wiener core portions 57 away from the bun 12 or wiener 14.

The circular knife 22 has a radially extending disk portion 46, knife 24 having a like disk portion 48, which disk portions extend away from the cylindrical mating portions 50 and 51 to limit the extent to which the circular knives 22 and 24 are inserted into the connection mouth 42. Knive 22 has an integral tubular body 45 extending away from the disk portion 46 along the longitudinal axis of the boring device 10. The knife 24 has a like tubular body 47, the difference between the two lying in their respective diameters and lengths, which are defined by the desired sizes of the bores 18, 18a and 20 to be formed. A threaded coupling 44 passes over the tubular bodies 45 and 47 of the respective knives 22 and 24 and is threadably connected to the one end 33 of the collar 32. As the threaded coupling 44 is screwed onto the end 33, an abutting relationship is established with the disk portions 46 and 48 securing the circular knives 22 or 24 in position.

The circular knife 22 (FIGS. 5, 6 and 7) has an open end 52 which projects into the bun 12, cutting a circular hole 58 in the bun with a serrated tooth circular cutting edge 54 formed around the periphery of the open end 52. The knife 24 (FIG. 4) includes like portions, including an open end 53 and serrated tooth circular cutting edge 55. A circular hole 59 is formed by the drill bit 24 in and along the length of the weiner.

A retainer structure 60 of the food boring device 10 is best seen in FIGS. 5 and 6. The retainer structure 60 is specifically constructed to carry either of the food products, the bun 12 or the wiener 14, holding them in prearranged position for insertion of the circular knives 22 or 24 along their respective lengths. In accomplishing the principal object of the invention, forming the bores 18 or 18a in the bun or the bore 20 in the wiener, the retainer structure moves slidably with respect to the hollow circular knives allowing for penetration of the serrated tooth edges 54 or 55 to a preestablished extent of the length of the bun 12 or the wiener 14.

The retainer structure 60 has a box-like configuration having a open end 66 which receives the circular knives 22 or 24 as the retainer structure slides along a portion of the length of the tubular bodies 45 or 47 of the knives 22 and 24. A main body 68 is constructed of an end wall 70, two side walls 72 and 73 and a bottom 74. A lid 64 fits over the top of the main body 68 and includes a downwardly projecting transverse cutting edge 62.

When a bore 20 is being formed in a wiener 14, an insert block bottom 96 and insert block top 98 having complementary recesses for the wiener 14 are inserted into the main body 68 (FIG. 3). The top insert block 96 has a slit 99 formed therethrough for passage of the cutting edge 62 as the lid 64 is placed over the main body 68. When a wiener 14 is being cored, and the insert block portions 96 and 98 are used, pins 100 pass through holes 75 in the sidewalls 72 and 73 into aligned holes in the block portions 96 and 98 to maintain their relative position.

The knife edge 62 is used to penetrate the bun 12 or wiener 14 at the innermost penetration of the serrated tooth edges 54 and 55 so that the core portion 56 separates from the bun 12 once the serrated teeth get to a position adjacent to the knife edge 62 (FIG. 7). At that point, vacuum from the vacuum chamber 27 applies a negative pressure of up to 30 in Hg., sufficient to remove the core 56.

When the wiener 14 is being cut, the principle is the same. The slit 99 in the top insert block 98 allows the passage of the knife edge 62 therethrough, which registers with the inward most termination of the serrated tooth edge 55 of the circular knife 24. The edge 62 used in conjunction with the wiener 14 will have to be a narrower edge then that used for the bun 12 to avoid completely severing the end of the wiener. In a manner as was discussed with the bun 12, the core portion 57 is moved under the influence of the vacuum pressure along the hollow portion of the circular knife 24, through the passageway 25 of the food coring device 10 and out the vacuum hose tube 38 to the vacuum chamber 27.

Slidable movement of the retainer structure 60 is accomplished by mounting the main body 68 at the bottom 74 to a laterally extending slide mount 76. A stripper plate 86 (FIGS. 5 and 6) having a hole 88 formed therethrough receives the knife 22 and upon retraction of the retainer structure 68 from the knife 22 cleans the outer surface of the knife 22 for the next cutting cycle. The stripper plate 86 is mounted to a second laterally extending slide block 77. Each of the slide blocks 76 and 77 has at each lateral side extent thereof a bore 78, in either side, respective bores 78 of the blocks 76 and 77 are in longitudinal alignment.

At either lateral side extent of the coring device 10 a slide rod 80 is mounted which passes through the bores 78 of the blocks 76 and 77. The slide rod is fixed at one end to a block 82 and at the other end to a slide rod support 84 at the support plate 29.

An insert plate 92 is held onto the stripper plate 86 by internal edges 90 for use with the circular knife 24 which cuts wieners 14 is seen in FIGS. 1, 2, and 5. A hole 94 is formed in the insert plate concentric with the hole 88 of the stripper plate 86. The hole 94 is approximately the same size as the outside diameter of the knife 24. Upon retraction of the retainer structure 70, the outer surface of the knife 24 is cleaned by being pulled through the hole 94 in the insert plate 92.

A spring 83 is mounted intermediate the slide block 77 about each of the slide rods support 84. A stop post 85 is set on the base 26 to stop movement of the slide block 77 and the retainer structure 60. The block 77 abuts against the retainer structure 60 as the retainer structure 60 is moved along the slide rods 80.

The vacuum chamber 27 is maintained by the vacuum pump at a vacuum pressure of between 0 and 30 in. Hg. As seen in FIG. 10, the vacuum chamber 27 is an essentially sealed vessel 102 in constant communication with the vacuum pump through line 104. The hose 38 is in selective communication with the vessel 102 as a result of the opeing or closing of vacuum gate valve 106. The gate is normally biased closed by spring 105. A vacuum gage and safety valve 108 are provided. A screen 110, angled with respect to a longitudinal axis of the boring device 10, protects the vacuum line 104 and hence the vacuum pump from ingesting core material portions 56 or 57 entering the vacuum chamber 27. Cores deposited in the vessel 102 are simply removed by a cap 112 connected to the vessel 102 by screws 113. A limit switch 114 is operative on the movement of the retainer structure 60 to a preestablished point, at which point in the cutting process the switch energizes solenoid 107 to open the gate valve and the core material is drawn into the vacuum chamber 27.

The operation of the food coring device 10 is most easily summarized by reference to FIGS. 1 and 2, relating to coring the wiener 14, the operation being virtually identical, with the exception of removal of the insert block bottom 98 and top 98, for the bun 12. The wiener 14 is inserted within the insert blocks 96 and 98 and the lid 64 put in place. The cutting edge 62 passes through the slit 99 and penetrates the wiener 14 near the end. The retainer structure 60 is manually pushed toward the rotating circular knive 24, which is being turned by the drive motor 43 and its connection to the collar 32. The serrated tooth edge 54 passes through the hole 94 in the insert plate 92 to penetrate the wiener, defining the hole 59 as penetration continues. The main body 68 makes contact with the slide block 77 and the attached insert plate 92. The main body 68 and plate 92 are moved together along the tubular body 47 until the slide block 77 reaches the stop post 85, located at the switch 114. Once maximum penetration of the tooth edge 54 has been achieved, the serrated teeth are essentially adjacent to the edge 62, and the vacuum gate 106 opened, pulling the core through the circular knife 24, the passageway 25, the hose 38, and into the vessel 102 of th vacuum chamber 27, where it is removed for disposal or further processing.

Though the invention has been described with a certain degree of particularity, the scope of the invention is more particularly defined in the appended claims.

What is claimed is:

1. An apparatus for forming bores within food products, diameters of the bores varying coresponding to the food product in which the bore is to be formed, a first bore formed within a first food product, a second food product of a diameter essentially equal to said first bore, said second food product inserted into said first bore of said first food product, said second food product having a second bore formed therein for receipt of other food products, said apparatus comprising in combination:

a mounting base having rotatably mounted thereto a longitudinally extending generally hollow connection assembly having one end operatively connected to a rotary drive means for turning said connection assembly about a longitudinal axis thereof, said connection assembly having a second end selectively connected to tubular cutting means of diameter equal to a diameter one of said first or said second bores, said tubular cutting means including a circular cutting edge at a terminal end thereof, the connection assembly and cutting means having a passageway extending along a longitudinal axis of said apparatus, said passageway in air vacuum communicaton with suction means sealingly connected to said one end of said connection assembly for removing core material from said food products along said passageway, retention means for receiving and holding said food products in a pre-set position relative to said cutting means, said retention means slidably secured to said mounting base for longitudinal movement over a fixed maximum distance therealong, said retention means further having stripping means for receiving said cutting means therethrough and for cleaning an outer surface of said cutting means on withdrawal of said cutting means from said retention means.

2. The invention as defined in claim 1 further including spring bias means secured to said mounting base for resisting the relative movement of said retention means.

3. The invention as defined in claim 1 wherein a stop is provided on said mounting base to prevent travel of said retention means further than said stop.

4. The invention as defined in claim 1 wherein said retention means includes an insert body receivable therein, said insert body conformable about said second food product and having a second opening in registered position with said first opening in said retention means said stripping means further including an insert plate with a hole for receiving and cleaning said cutting means for cutting said second food product.

5. The invention as defined in claim 4 wherein said insert body and retention means include means for securing said insert body relative to said retention means.

6. The invention defined in claim 1 wherein said retention means includes a lower portion essentially conformable about said food product and a lid connectable to said lower portion having a cutting edge connected thereto for penetrating said food product at a pre-established position near the deepest penetration of said cutting means to thereby allow for removal of the core upon said cutting means reaching the preestablished position.

7. The invention as defined in claim 1 wherein said suction means operates intermittently, said suction means operative on the position of said retention means.

8. The invention as defined in claim 7 wherein said suction means includes a vacuum chamber connected to a vacuum pump, said vacuum chamber in air communication with said passageway of said apparatus, a gate valve operable on the position of said retention means to open and close said passageway.

9. The invention as defined in claim 8 wherein the vacuum pressure in said vacuum chamber is no greater than 30 inches Hg.

10. The invention defined in claim 8 wherein a screen covers the connection from the vacuum chamber to the vacuum pump, for blocking core material from entering the vacuum pump.

11. An apparatus for forming bores in food products comprising in combination:
    retention means for securing the food product including a box structure having an open end for receiving cutting means for cutting a circular hole along a part of the length of the food product and a lid for covering said box structure, said cutting means of hollow tubular construction having a hollow mounting end and a cutting end, said mounting end operatively connected to means for rotating said cutting means and sealingly connected to suction means for evacuating the interior of said cutting means, said cutting means and said retention means movable relative to each other.

12. The invention as defined in claim 11 wherein the movement of one or the other of the cutting means or the retainer structure to a pre-established position actuates a valve to provide selective air communication of said suction means with said cutting means, said pre-established position being at the maximum penetration of said cutting means into said food product.

13. An apparatus for forming bores in food products, comprising in combination:
    retention means for holding said food product;
    cutting means for cutting a circle along a pre-established portion of the length of said food product and about a core of said food product;
    means for providing relative movement between said retention means and said boring means;
    second cutting means for transversely slitting the food product at the end of the core of said food product; and
    suction means operatively connected to said cutting means for removing core material from said food product to a predefined location.

14. The invention as defined in claim 13 wherein said cutting means further includes a hollow tubular coring knife terminating at one end in a circular cutting edge and at connection at an opposite end to rotary drive means for rotating said knife.

15. The invention as defined in claim 13 wherein said suction means further includes a vacuum chamber maintained at a negative pressure of no more than 30 in HG by a vacuum pump, said vacuum chamber in selective air communication with said cutting means.

16. The invention as defined in claim 15 wherein selective communication is established by a gate valve operative on a solenoid activated by a switch activated at a position wherein the means for providing relative movement between said retention means and said cutting means moves the retention menas or the boring moves to a position equal to the length of the core in said food product.

17. The invention as defined in claim 14 wherein a rotary seal connects said suction means to said rotary drive means.

18. The invention as defined in claim 15 wherein a screen is mounted in said vacuum chamber to protect core material from entering the vacuum pump.

19. The invention as defined in claim 14 wherein said one end of said knife has serrated teeth around the circular end of the knife.

* * * * *